United States Patent [19]
Geronimi et al.

[11] Patent Number: 5,465,349
[45] Date of Patent: Nov. 7, 1995

[54] SYSTEM FOR MONITORING ABNORMAL INTEGRATED CIRCUIT OPERATING CONDITIONS AND CAUSING SELECTIVE MICROPROCESSOR INTERRUPTS

[75] Inventors: Francois Geronimi, Aix en Provence; Paul Sourenian, Marseille, both of France

[73] Assignee: Gemplus Card International, Gemenos, France

[21] Appl. No.: 384,531

[22] Filed: Oct. 5, 1994

Related U.S. Application Data

[63] Continuation of Ser. No. 779,817, Oct. 21, 1991, abandoned.

[30] Foreign Application Priority Data

Oct. 20, 1990 [FR] France .................... 90 12986

[51] Int. Cl.$^6$ ................... G06F 11/24; G06F 11/30; G06F 12/14
[52] U.S. Cl. ................ 364/550; 395/183.1; 395/184.01; 395/186; 395/183.06
[58] Field of Search ............ 365/228; 395/425, 395/575, 725

[56] References Cited

U.S. PATENT DOCUMENTS

| | | | |
|---|---|---|---|
| 4,827,149 | 5/1989 | Yabe | 307/64 |
| 4,939,353 | 7/1990 | Iijima | 235/438 |
| 5,204,840 | 4/1993 | Mazur | 365/228 |
| 5,206,938 | 4/1993 | Fujioka | 395/400 |
| 5,218,607 | 6/1993 | Saito et al. | 371/66 |

FOREIGN PATENT DOCUMENTS

| | | |
|---|---|---|
| 0341712 | 4/1990 | European Pat. Off. . |
| 3706466 | 6/1987 | Germany . |

*Primary Examiner*—David L. Robertson
*Assistant Examiner*—B. James Peikari
*Attorney, Agent, or Firm*—Pollock, Vande Sande & Priddy

[57] ABSTRACT

The invention relates to integrated circuits and, notably, to circuits for which it is desired to provide security against any fraudulent usage. The circuits concerned are microprocessor circuits having a program memory, a programmable non-volatile memory, at least one input/output port and an RS register memorizing the signals from sensors of abnormal conditions. This register is accessible by the microprocessor. There is provision for means to check the state of the register immediately before any operation for the writing or erasure of the programmable memory, and immediately before any transmission of data towards the exterior of the input/output port, and means to interrupt the working of the microprocessor if the check reveals abnormal conditions.

2 Claims, 1 Drawing Sheet

SYSTEM FOR MONITORING ABNORMAL INTEGRATED CIRCUIT OPERATING CONDITIONS AND CAUSING SELECTIVE MICROPROCESSOR INTERRUPTS

This application is a continuation of U.S. patent application Ser. No. 07/779,817, filed Oct. 21, 1991, now abandoned.

BACKGROUND OF THE INVENTION

1. Field of the Invention

The invention relates to integrated circuits for which security of operation has to be provided against attempts at fraudulent use.

This is the case notably with integrated circuits for chip cards designed, for example, to carry out monetary transactions or to enable access by specific individuals to protected premises etc.

These integrated circuits incorporate confidential information elements, stored in memories, for example non-volatile, electrically erasable, and programmable memories. It is necessary that these information elements are not sent out of the circuit through fraudulent operations.

2. Description of the Prior Art

This is why there is generally provision, in the integrated circuit, for a certain number of sensors known as security sensors, the function of which is to observe a certain number of operational or environmental conditions and prompt a break in the functioning of the circuit when abnormal conditions are detected.

For example, there is a frequency sensor that observes the working frequency of the circuit and is capable of giving a signal if this frequency is below a determined threshold (an excessively low frequency would make it easier for a spy to get a peep into the behavior of the circuit or of the card).

In the same way, there may be a supply voltage sensor that provides a signal if this voltage is too low or too high. And again, a light sensor that detects any instance where the package of the integrated circuit is opened in order to obtain access, by observation, to confidential information. Again, for example, there may be a passivation sensor (to sense the presence of a passivation layer above the circuit), a temperature sensor etc.

Thus, several physical safety sensors are provided, and each of them may deliver a logic signal representing the appearance of a fault.

In microprocessor-based integrated circuits, it is normal to design the system so that the security check to be conducted by the microprocessor of the circuit itself.

It has already been proposed that the logic signals coming from the physical safety sensors should be memorized in a register that is directly controlled by the microprocessor. This register is initially set at zero. The appearance of a non-null bit at a position of the register means that an abnormal condition of operation has been observed. The flipping-over of the register is irreversible in principle, i.e. a bit stored in the register does not disappear even if the abnormal conditions disappear. In practice, the register cannot be reset at zero unless the integrated circuit is reinitialized (i.e. disconnected and turned on again)

In principle, the circuits work as follows: when the voltage is turned on, the microprocessor carries out an initialization program. Then it carries out a security test in which the state of the security register is verified. If all the bits are at zero, the operation may continue. If not, the operation is definitively interrupted and the circuit must be turned off.

It has been observed however that the security is insufficient since subsequent changes can no longer be detected.

A possible approach would be to see to it that the working programs of the card all contain instructions for the periodic checking of the state of the register. However, the problem is that this would greatly interfere with the normal progress of the program, and that it is difficult to provide for a test of the register as frequently as would be needed.

It is also possible to have the register connected to a switching pin of the central unit of the microprocessor, but these pins are not numerous and have to be reserved for other uses.

SUMMARY OF THE INVENTION

According to the invention, means are provided, in the integrated circuit, to test the state of the register, firstly before each transmission of information to the exterior of the integrated circuit and, secondly, before each modification of information in a memory that forms part of the integrated circuit (in general, this memory will be an electrically programmable non-volatile memory or an electrically programmable and erasable non-volatile memory).

The starting point of the invention is the observation that the microprocessor-based integrated circuits are controlled by a program read-only memory (ROM) that comprises a certain number of sub-programs including a program for writing or erasing in the memory and a program for the transmission of information to the exterior: it is then easy to place instructions, at the head of each of these sub-programs, to check the state of the security register.

These programs are often used, and they correspond precisely to actions for which security is important, namely when there is a risk that confidential information might be transmitted to the exterior, or a risk of unauthorized writing or erasure in unauthorized zones of the memory. With a small number of program instructions, the register may be tested and may interrupt the sub-program as soon as it starts or immediately after it has started.

For example, a chip card memory program has 5,000 bytes of instructions that can be carried out by the microprocessor. The writing or erasure programs or the programs for the transmission of information to the exterior include, for example, about a hundred instructions each (to write or transmit a byte); about twenty additional bytes may enable the test to be made before these sub-programs.

Thus, the memory will use up only a small number of additional bytes to provide for very efficient security since the checking takes place before the strategic operations for the writing and transmission of information.

BRIEF DESCRIPTION OF THE DRAWINGS

Other features and advantages of the invention will appear from the following detailed description, made with reference to the appended drawings, of which.

MORE DETAILED DESCRIPTION

The integrated circuit has a microprocessor, namely a central processing unit (CPU) 10 and associated resources which may be:

a read-only memory (ROM) 12 containing instructions that can be carried out by the microprocessor;

a working random-access memory (RAM) 14;

a non-volatile electrically programmable memory (EPROM) 16 and, preferably, one that is also electrically erasable (EEPROM). This memory may include data and possibly instructions for the microprocessor. It may include, notably, data elements the contents of which should not be touched and confidential data which should not be transmitted to the exterior of the circuit;

input/output ports 18 making it possible, notably, to transmit information on external connection pins I/O of the integrated circuit (the transmission will generally be done serially to minimize the number of pins of the circuit, at least in chip card applications).

Furthermore, the microprocessor is directly connected to registers, the contents of which it can read and which it can reset at zero.

Among these registers, there is an RS register, the inputs of which are connected to various security sensors (C1, C2, C3, C4 for example) such as those mentioned here above.

As has been explained, these sensors are designed to check the environmental conditions and the conditions of operation of the circuit in order to prevent fraudulent operations that would become possible if these conditions were to become abnormal. Examples of sensors have been given here above.

This RS register will be tested according to the invention whenever the program of application of the card (in a ROM or EEPROM memory) involves an operation for the transmission of information to the exterior (by the I/O contact) and also whenever the program involves an operation to modify the contents of the non-volatile memory 16.

Figure 1:
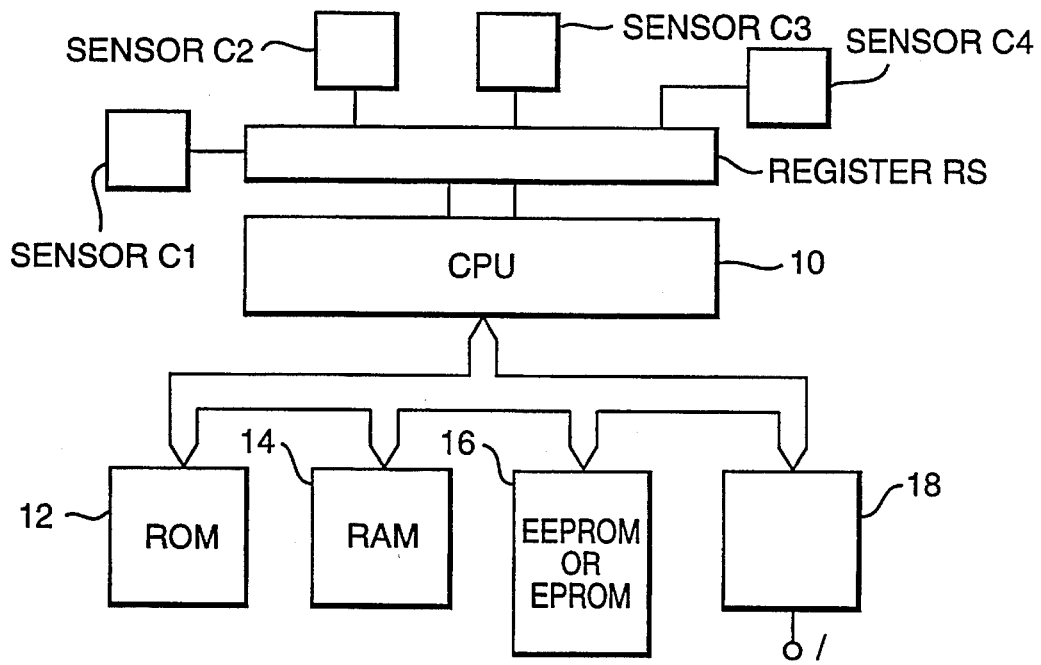
FIG. 1 shows the general organization of a microprocessor-based integrated circuit concerned by the invention.
Figure 2:
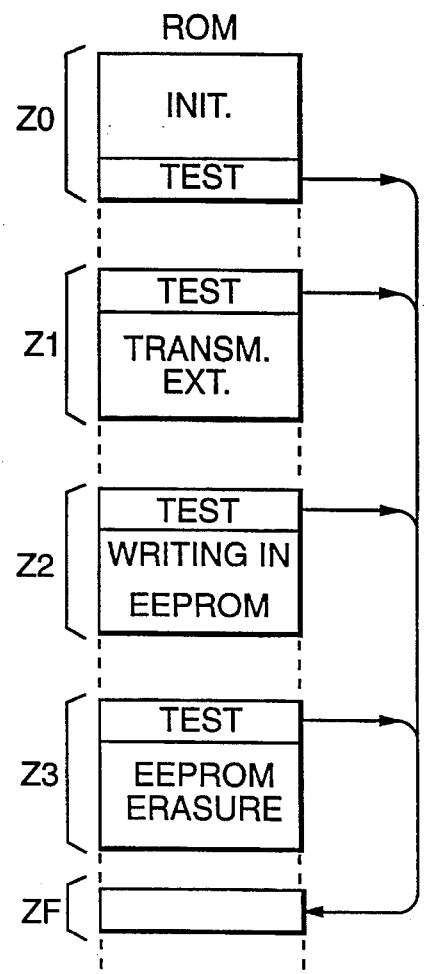
FIG. 2 shows the organization of the means according to the invention.

These operations are controlled by the microprocessor, by means of sub-programs stored in the read-only memory ROM 12 which manages the entire operation of the card. The organization of the read-only memory 12 is represented symbolically in FIG. 2.

The memory is addressed sequentially, in such a way that the instructions memorized at successive addresses are carried out successively, except for successive instructions for skipping to a different location of the memory.

A starting zone of the memory Z0 contains, for example, an initialization program enabling the microprocessor to carry out preliminary operations after the system is turned on (these preliminary operations include, notably, the zero-setting of the RS register). Preferably, an operation to test the RS register is carried out at the end of the initialization program. At this stage, the conditions of environment and operation of the circuit would indeed have to be normal in order that the circuit may be permitted to function. If the test is positive (with the RS register at zero and no detection of abnormal conditions), then the operation of the integrated circuit continues. If the test is negative (if the register contains a bit relating to the detection of an abnormal condition), then an instruction of routing towards a zone ZF of the ROM is carried out. In this zone ZF, there is placed an instruction or routine placing the microprocessor on standby, and the microprocessor cannot leave this standby state except by reinitialization (for example by being disconnected and turned on again).

Other zones of the program memory 12 are used to carry out various operations. The microprocessor may obtain access to the first address of each of these zones when it receives a command to carry out a certain operation. The zone then contains the series of instructions necessary for the performance of this operation. It is, for example, an application program placed in the EEPROM 16, a program that can be carried out by the microprocessor, which calls up sub-programs placed in the zones of the read-only memory 12 when it has need of them.

Among the possible operations, there is the transmission, to the exterior, of an n-bit word (for example an 8-bit byte) through the input/output port 18. This operation is carried out by means of a sub-program contained in a zone Z1 of the ROM. This sub-program is called upon whenever a word has to be transmitted.

Another operation carried out by a sub-program is the operation for writing a word or a bit in the non-volatile programmable memory 16. The corresponding instructions form a sub-program placed in a zone Z2 of the read-only memory. In the same way, an operation for the erasure of all or part of the programmable memory 16 is carried out by a sub-program placed in a zone Z3 of the read-only memory 12.

According to the invention, it is provided that the first instructions of the zones Z1, Z2 and Z3 will be instructions for checking the state of the RS register, this register being directly accessible in reading mode by the microprocessor. If the result is positive (with normal conditions being detected by the sensors C1 to C4), the sub-program of the zone Z1, Z2 or Z3 respectively is carried out and the corresponding operation (transmission, writing or erasure respectively) is performed. If not, a routing instruction towards the zone ZF is carried out and the microprocessor is placed on definitive standby.

Given the fact that the instructions needed for the checking of the register occupy only some tens of bytes, placed at the start of two or three zones of sub-programs at a maximum, it is seen that the amount of ROM used to provide excellent security is not excessive. This is important, for the available ROM space is limited and should be reserved for numerous other essential operations for the management of the working of the microprocessor.

What is claimed is:

1. An integrated circuit comprising:

a first memory means for storing application programs;

a second memory means which is programmable and non-volatile, for storing data;

at least one I/O port means;

a plurality of means for continually sensing ambient conditions or electrical conditions of the integrated circuit which fall outside a normal operating range;

register means for storing sensing information from the sensing means indicative of said ambient conditions or said electrical conditions of the integrated circuit which fall outside said normal operating range;

a microprocessor means connected to said first and second memory means, said I/O port means, and said register means;

said first memory means storing test subroutines for causing said microprocessor means to detect the presence or absence of said sensing information in said register means only in response to requests for the execution of one or more of said subroutines in the set consisting of;

(a) writing data to said second memory means;

(b) clearing data from said second memory means; or (c) transmission of data from said second memory means, through the I/O port;

the microprocessor means being interrupted if said sensing information is found to be present in said register means.

2. An integrated circuit as set forth in claim 1 wherein interruption of the microprocessor means causes the microprocessor means to remain in a standby mode until reinitialized.

* * * * *